United States Patent
Natarajan et al.

(10) Patent No.: US 11,804,983 B2
(45) Date of Patent: Oct. 31, 2023

(54) METHOD AND SYSTEM TO SCALE ROUTING IN ETHERNET VIRTUAL PRIVATE NETWORK SYMMETRIC INTEGRATED ROUTING AND BRIDGING DEPLOYMENTS

(71) Applicant: Hewlett Packard Enterprise Development LP, Houston, TX (US)

(72) Inventors: Venkatesh Natarajan, Bengaluru (IN); Badrish Adiga H R, Bengaluru (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 301 days.

(21) Appl. No.: 17/150,762

(22) Filed: Jan. 15, 2021

(65) Prior Publication Data

US 2022/0231880 A1    Jul. 21, 2022

(51) Int. Cl.
*H04L 12/46* (2006.01)
*H04L 41/0806* (2022.01)
*H04L 45/748* (2022.01)
*H04L 41/0813* (2022.01)

(52) U.S. Cl.
CPC ...... *H04L 12/4633* (2013.01); *H04L 12/4641* (2013.01); *H04L 41/0806* (2013.01); *H04L 41/0813* (2013.01); *H04L 45/748* (2013.01)

(58) Field of Classification Search
CPC ............. H04L 12/4633; H04L 12/4641; H04L 41/0806; H04L 41/0813; H04L 45/748; H04L 2012/4629
See application file for complete search history.

(56) References Cited

U.S. PATENT DOCUMENTS

| | | | |
|---|---|---|---|
| 10,164,885 B2 * | 12/2018 | Shen | H04L 45/7453 |
| 2019/0268393 A1 * | 8/2019 | Panagos | H04L 61/106 |
| 2020/0313956 A1 * | 10/2020 | Heitz | H04L 45/04 |
| 2021/0218672 A1 * | 7/2021 | Mackie | H04L 12/4633 |

OTHER PUBLICATIONS

VxLAN/EVPN and Integrated Routing Bridging (Year: 2015).*
EVPN Hybrid IRB Mode (Year: 2018).*

* cited by examiner

*Primary Examiner* — Kodzovi Acolatse
*Assistant Examiner* — Anindita Sen
(74) *Attorney, Agent, or Firm* — Park, Vaughan, Fleming & Dowler LLP

(57) ABSTRACT

One embodiment provides a system which facilitates scaling of routing in an EVPN. During operation, the system determines, in an Ethernet Virtual Private Network (EVPN), a plurality of virtual tunnel endpoints (VTEPs) coupled to a plurality of subnets, wherein a respective subnet includes one or more hosts, wherein a first VTEP is configured with a first number of host routes for a first subnet coupled to a second VTEP, and wherein each of the first number of host routes corresponds to a host residing in the first subnet. Responsive to detecting that a total number of routes configured on the first VTEP exceeds a first predetermined threshold, the system aggregates the first number of host routes by replacing the first number of host routes with a first prefix route which indicates the first subnet.

17 Claims, 12 Drawing Sheets

200

| VTEP1 202 | VTEP2 204 | VTEP3 206 |
|---|---|---|
| VLAN2 (2.1.0.0/18) | --- | VLAN2 (2.1.0.0/18) |
| VLAN3 (3.1.0.0/18) | VLAN3 (3.1.0.0/18) | --- |
| --- | VLAN4 (4.1.0.0/18) | VLAN4 (4.1.0.0/18) |
| --- | VLAN5 (5.1.0.0/18) | VLAN5 (5.1.0.0/18) |

| VTEP1 202 | VTEP2 204 | VTEP3 206 |
|---|---|---|
| Directly connected hosts on VLANs:<br>VLAN2: 4000<br>VLAN3: 5000<br>---<br>--- | Directly connected hosts on VLANs:<br>---<br>VLAN3: 9000<br>VLAN4: 5000<br>VLAN5: 1000 | Directly connected hosts on VLANs:<br>VLAN2: 5000<br>---<br>VLAN4: 7000<br>VLAN5: 0 |
| Number of EVPN Routes (/32):<br>VLAN2: VTEP3-5000<br>VLAN3: VTEP2-9000<br>VLAN4: VTEP2-5000, VTEP3-7000<br>VLAN5: VTEP2-1000, VTEP3-0<br>Total: 27000 | Number of EVPN Routes (/32):<br>VLAN2: VTEP1-4000, VTEP3-5000<br>VLAN3: VTEP1-5000<br>VLAN4: VTEP3-7000<br>VLAN5: VTEP3-0<br>Total: 21000 | Number of EVPN Routes (/32):<br>VLAN2: VTEP1-4000<br>VLAN3: VTEP1-5000, VTEP2-9000<br>VLAN4: VTEP2-5000<br>VLAN5: VTEP2-1000<br>Total: 24000 |

212 (Directly connected hosts on VLANs)
214 (Number of EVPN Routes)

FIG. 2B

| VTEP1 202 | VTEP2 204 | VTEP3 206 |
|---|---|---|
| Directly connected hosts on VLANs:<br>VLAN2: 4000<br>VLAN3: 5000<br>---<br>--- | Directly connected hosts on VLANs:<br>---<br>VLAN3: 9000<br>VLAN4: 5000 + 1<br>VLAN5: 1000 | Directly connected hosts on VLANs:<br>VLAN2: 5000<br>---<br>VLAN4: 7000<br>VLAN5: 0 |
| Number of EVPN Routes (/32):<br>VLAN2: VTEP3-5000<br>VLAN3: VTEP2-9000<br>VLAN4: VTEP2-5001, ⌐VTEP3-7000¬ ~226<br>VLAN5: ⌐VTEP2-1000¬ VTEP3-0<br>Total: 27001  ⌐227 | Number of EVPN Routes (/32):<br>VLAN2: VTEP1-4000, VTEP3-5000<br>VLAN3: VTEP1-5000<br>VLAN4: VTEP3-7000<br>VLAN5: VTEP3-0<br>Total: 21000 | Number of EVPN Routes (/32):<br>VLAN2: VTEP1-4000<br>VLAN3: VTEP1-5000, VTEP2-9000<br>VLAN4: VTEP2-5001<br>VLAN5: VTEP2-1000<br>Total: 24001 |
| Number of Routes in ASIC (Optimized):<br>VLAN2: 5000 EVPN (/32) + 1 Conn (/18)<br>VLAN3: 9000 EVPN (/32) + 1 Conn (/18)<br>VLAN4: 5001 EVPN (/32) + ⌐1 Opt (/18)¬ ~228<br>VLAN5: ⌐1 Opt (/18)¬ ~229<br>Total: 19005 (~63% of 30000) | Number of Routes in ASIC:<br>VLAN2: 9000 EVPN (/32)<br>VLAN3: 5000 EVPN (/32) + 1 Conn (/18)<br>VLAN4: 7000 EVPN (/32) + 1 Conn (/18)<br>VLAN5: 1 Conn (/18)<br>Total: 21003 (~70% of 30000) | Number of Routes in ASIC:<br>VLAN2: 4000 EVPN (/32) + 1 Conn (/18)<br>VLAN3: 14000 EVPN (/32)<br>VLAN4: 5001 EVPN (/32) + 1 Conn (/18)<br>VLAN5: 1000 EVPN (/32) + 1 Conn (/18)<br>Total: 25004 (~83% of 30000) |
| Number of Routes Optimized:<br>⌐7998¬ ~230 | Number of Routes Optimized:<br>0 | Number of Routes Optimized:<br>0 |
| 1st Event: Add one host to VLAN4 on VTEP2.<br>Result of 1st Event:<br>TRIGGER 225 (90% of ASIC limit reached at VTEP1)<br>→ Optimize VTEP1 for VLAN4 and VLAN5 (the subnets which have only EVPN /32 host routes) | | |

FIG. 2C

| VTEP1 202 | VTEP2 204 | VTEP3 206 |
|---|---|---|
| Directly connected hosts on VLANs:<br>VLAN2: 4000<br>VLAN3: 5000<br>----<br>---- | Directly connected hosts on VLANs:<br>----<br>VLAN3: 9000<br>VLAN4: 5001<br>VLAN5: 1000 | Directly connected hosts on VLANs:<br>VLAN2: 5000 + 4000<br>----<br>VLAN4: 7000 + 2001<br>VLAN5: 0 |
| Number of EVPN Routes (/32):<br>VLAN2: VTEP3-9000<br>VLAN3: VTEP2-9000<br>VLAN4: VTEP2-5001, VTEP3-9001<br>VLAN5: VTEP2-1000, VTEP3-0<br>Total: 33002 | Number of EVPN Routes (/32):<br>VLAN2: VTEP1-4000, VTEP3-9000 ~246<br>VLAN3: VTEP1-5000<br>VLAN4: VTEP3-9001<br>VLAN5: VTEP3-0<br>Total: 27001 | Number of EVPN Routes (/32):<br>VLAN2: VTEP1-4000<br>VLAN3: VTEP1-5000, VTEP2-9000<br>VLAN4: VTEP2-5001<br>VLAN5: VTEP2-1000<br>Total: 24001 |
| Number of Routes in ASIC:<br>VLAN2: 9000 EVPN (/32) + 1 Conn (/18)<br>VLAN3: 9000 EVPN (/32) + 1 Conn (/18)<br>VLAN4: 5001 EVPN (/32) + 1 Opt (/18)<br>VLAN5: 1 Opt (/18)<br>Total: 23005 (~77% of 30000) | Number of Routes in ASIC (Optimized):<br>VLAN2: 4000 EVPN (/32) + 1 Opt (/18) ~247<br>VLAN3: 5000 EVPN (/32) + 1 Conn (/18)<br>VLAN4: 9001 EVPN (/32) + 1 Conn (/18)<br>VLAN5: 1 Conn (/18)<br>Total: 18005 (~60% of 30000) | Number of Routes in ASIC:<br>VLAN2: 4000 EVPN (/32) + 1 Conn (/18)<br>VLAN3: 14000 EVPN (/32)<br>VLAN4: 5001 EVPN (/32) + 1 Conn (/18)<br>VLAN5: 1000 EVPN (/32) + 1 Conn (/18)<br>Total: 25004 (~83% of 30000) |
| Number of Routes Optimized:<br>9999; (7998 + 2001) | Number of Routes Optimized:<br>8999 ~248 | Number of Routes Optimized:<br>0 |
| 2nd Event: Add 4000 hosts to VLAN2 and 2001 hosts to VLAN4 on VTEP3.<br>Result of 2nd Event:<br>TRIGGER 245 (90% of ASIC limit reached at VTEP2)<br>→ Optimize VTEP2 for VLAN2 (the subnets which has only EVPN /32 host routes) | | |

FIG. 2D

| VTEP1 202 | VTEP2 204 | VTEP3 206 |
|---|---|---|
| Directly connected hosts on VLANs:<br>VLAN2: 4000 + 3000<br>VLAN3: 5000<br>---<br>--- | Directly connected hosts on VLANs:<br>---<br>VLAN3: 9000<br>VLAN4: 5001<br>VLAN5: 1000 | Directly connected hosts on VLANs:<br>VLAN2: 9000<br>---<br>VLAN4: 9001<br>VLAN5: 0 |
| Number of EVPN Routes (/32):<br>VLAN2: VTEP3-9000<br>VLAN3: VTEP2-9000<br>VLAN4: VTEP2-5001, VTEP3-9001<br>VLAN5: VTEP2-1000, VTEP3-0<br>Total: 33002 | Number of EVPN Routes (/32):<br>VLAN2: VTEP1-7000, VTEP3-9000<br>(=16,000 EVPN (/32)) — 259<br>VLAN3: VTEP1-5000<br>VLAN4: VTEP3-9001<br>VLAN5: VTEP3-0<br>Total: 30001 | Number of EVPN Routes (/32):<br>VLAN2: VTEP1-7000<br>VLAN3: VTEP1-5000, VTEP2-9000 — 256<br>VLAN4: VTEP2-5001<br>VLAN5: VTEP2-1000<br>Total: 27001 |
| Number of Routes in ASIC:<br>VLAN2: 9000 EVPN (/32) + 1 Conn (/18)<br>VLAN3: 9000 EVPN (/32) + 1 Conn (/18)<br>VLAN4: 5001 EVPN (/32) + 1 Opt (/18)<br>VLAN5: 1 Opt (/18)<br>Total: 23005 (~77% of 30000)<br>Number of Routes Optimized:<br>9999 | Number of Routes in ASIC:<br>VLAN2: 7000 EVPN (/32) + 1 Conn (/18)<br>VLAN3: 5000 EVPN (/32) + 1 Conn (/18)<br>VLAN4: 9001 EVPN (/32) + 1 Conn (/18)<br>VLAN5: 1 Conn (/18)<br>Total: 21005 (~70% of 30000)<br>Number of Routes Optimized:<br>8999 | Number of Routes in ASIC (Optimized):<br>VLAN2: 7000 EVPN (/32) + 1 Conn (/18)<br>VLAN3: 5000 EVPN (/32) + 1 Opt (/18) — 257<br>VLAN4: 5001 EVPN (/32) + 1 Conn (/18)<br>VLAN5: 1000 EVPN (/32) + 1 Conn (/18)<br>Total: 18005 (~63% of 30000)<br>Number of Routes Optimized:<br>9000 — 258 |
| 3rd Event: Add 3000 hosts to VLAN2 for VTEP1.<br>Result of 3rd Event:<br>TRIGGER 255 (90% of ASIC limit reached at VTEP3)<br>→ Optimize VTEP3 for VLAN3 (the subnet which has only EVPN /32 host routes)<br>TRIGGER 259 (90% of subnet limit reached for VLAN2 at VTEP2)<br>→ VTEP2 is already optimized for VLAN2. | | |

FIG. 2E

| VTEP1 202 | VTEP2 204 | VTEP3 206 |
|---|---|---|
| Directly connected hosts on VLANs:<br>VLAN2: 7000<br>VLAN3: 5000 + 8000<br>---<br>--- | Directly connected hosts on VLANs:<br>---<br>VLAN3: 9000 - 6000<br>VLAN4: 5001<br>VLAN5: 1000 | Directly connected hosts on VLANs:<br>VLAN2: 9000<br>---<br>VLAN4: 9001<br>VLAN5: 0 |
| Number of EVPN Routes (/32):<br>VLAN2: VTEP3-9000<br>VLAN3: VTEP2-3000<br>VLAN4: VTEP2-5001, VTEP3-9001<br>VLAN5: VTEP2-1000, VTEP3-0<br>Total: 27002 | Number of EVPN Routes (/32):<br>VLAN2: VTEP1-7000, VTEP3-9000<br>(= 16,000 EVPN (/32))<br>VLAN3: VTEP1-13000<br>VLAN4: VTEP3-9001<br>VLAN5: VTEP3-0<br>Total: 38001 | Number of EVPN Routes (/32):<br>VLAN2: VTEP1-7000<br>VLAN3: VTEP1-13000, VTEP2-3000<br>VLAN4: VTEP2-5001<br>VLAN5: VTEP2-1000<br>Total: 29001 |
| Number of Routes in ASIC:<br>VLAN2: 9000 EVPN (/32) + 1 Conn (/18)<br>VLAN3: 3000 EVPN (/32) + 1 Conn (/18)<br>VLAN4: 5001 EVPN (/32) + 1 Opt (/18)<br>VLAN5: 1 Opt (/18)<br>Total: 17005 (~53% of 30000) | Number of Routes in ASIC:<br>VLAN2: 7000 EVPN (/32) + 1 Opt (/18)<br>VLAN3: 13000 EVPN (/32) + 1 Conn (/18)<br>VLAN4: 9001 EVPN (/32) + 1 Conn (/18)<br>VLAN5: 1 Conn (/18)<br>Total: 29005 (~97% of 30000) | Number of Routes in ASIC (Optimized):<br>VLAN2: 7000 EVPN (/32) + 1 Conn (/18)<br>VLAN3: (1 Opt (/18)) + 3000 EVPN (/32)<br>VLAN4: 5001 EVPN (/32) + 1 Conn (/18)<br>VLAN5: 1000 EVPN (/32) + 1 Conn (/18)<br>Total: 16005 (~53% of 30000) |
| Number of Routes Optimized:<br>9999 | Number of Routes Optimized:<br>8999 | Number of Routes Optimized:<br>13999 |
| 4th Event: Add 8000 hosts to VLAN3 for VTEP1 and remove 6000 hosts from VLAN3 for VTEP 2.<br>Result of 4th Event:<br>TRIGGER 265 (90% of ASIC limit reached at VTEP2)<br>→ Furthermore optimization not possible at VTEP2<br>TRIGGER 266 (90% of ASIC limit reached at VTEP3)<br>→ Re-optimize VTEP3 for VLAN3 (by reconfiguring host routes for VTEP2, removing prefix route for VTEP2,<br>configuring prefix route for VTEP1, removing host routes for VTEP1, etc.) | | |

FIG. 2F

| VTEP1 202 | VTEP2 204 | VTEP3 206 |
|---|---|---|
| Directly connected hosts on VLANs:<br>VLAN2: 7000 - 5000<br>VLAN3: 13000<br>----<br>---- | Directly connected hosts on VLANs:<br>----<br>VLAN3: 3000<br>VLAN4: 5001<br>VLAN5: 1000 | Directly connected hosts on VLANs:<br>VLAN2: 9000 + 5000<br>----<br>VLAN4: 9001<br>VLAN5: 0 |
| Number of EVPN Routes (/32):<br>VLAN2: VTEP3-14000<br>VLAN3: VTEP2-3000<br>VLAN4: VTEP2-5001, VTEP3-9001<br>VLAN5: VTEP2-1000, VTEP3-0<br>Total: 32002 | Number of EVPN Routes (/32):<br>VLAN2: VTEP1-2000, VTEP3-14000<br>(= 16,000 EVPN (/32))<br>VLAN3: VTEP1-13000<br>VLAN4: VTEP3-9001<br>VLAN5: VTEP3-0<br>Total: 38001 | Number of EVPN Routes (/32):<br>VLAN2: VTEP1-2000 ~286<br>VLAN3: VTEP1-13000, VTEP2-3000<br>VLAN4: VTEP2-5001<br>VLAN5: VTEP2-1000<br>Total: 24001 |
| Number of Routes in ASIC:<br>VLAN2: 14000 EVPN (/32) + 1 Conn (/18)<br>VLAN3: 3000 EVPN (/32) + 1 Conn (/18)<br>VLAN4: 5001 EVPN (/32) + 1 Opt (/18)<br>VLAN5: 1 Opt (/18)<br>Total: 22005 (~73% of 30000) | Number of Routes in ASIC:<br>VLAN2: 2000 EVPN (/32) + 1 Opt (/18)<br>VLAN3: 13000 EVPN (/32) + 1 Conn (/18)<br>VLAN4: 9001 EVPN (/32) + 1 Conn (/18)<br>VLAN5: 1 Conn (/18)<br>Total: 24005 (~80% of 30000) | Number of Routes in ASIC (Optimized):<br>VLAN2: 2000 EVPN (/32) + 1 Conn (/18)<br>VLAN3: 1 Opt (/18) + 3000 EVPN (/32)<br>VLAN4: 5001 EVPN (/32) + 1 Conn (/18)<br>VLAN5: 1000 EVPN (/32) + 1 Conn (/18)<br>Total: 11005 (~37% of 30000) |
| Number of Routes Optimized:<br>9999 | Number of Routes Optimized:<br>13999 (8999 + 5000) | Number of Routes Optimized:<br>13999 |
| 5th Event: Move 5000 hosts on VLAN2 from VTEP1 to VTEP3.<br>Result of 5th Event:<br>No impact in aggregation, but increase in number of routes optimized on VTEP2 (due to addition of 5000 EVPN routes for VLAN2 to VTEP3, which routes are already aggregated) | | |

FIG. 2G

METHOD AND SYSTEM TO SCALE ROUTING IN ETHERNET VIRTUAL PRIVATE NETWORK SYMMETRIC INTEGRATED ROUTING AND BRIDGING DEPLOYMENTS

BACKGROUND

Field

This disclosure is generally related to the field of routing. More specifically, this disclosure is related to a method and system to scale routing in Ethernet Virtual Private Network (EVPN) Symmetric Integrated Routing and Bridging (Symmetric-IRB) deployments.

Related Art

Ethernet Virtual Private Network (EVPN) for Virtual Extensible Local Area Network (VXLAN) can provide control plane operations for VXLAN tunnels and can define a way for VXLAN Tunnel Endpoints (VTEPs) to discover other VTEPs in the EVPN as well as other connected hosts. Two types of Integrated Routing and Bridging (IRB) solutions may be used in an EVPN: Asymmetric-IRB and Symmetric-IRB. In asymmetric-IRB, each VTEP is configured with all the source and destination VXLAN network identifiers (VNIs) for bi-directional VXLAN traffic traveling on different VNIs in each direction across the routed infrastructure. This can result in an increase in the number of Internet Protocol (IP)/Media Access Control (MAC) addresses held by each VTEP, which can result in hitting the hardware limitations of the VTEP.

In Symmetric-IRB, each VTEP only needs to be configured with VNIs for its hosted VLANs (e.g., local VNIs). However, the number of routes that each VTEP can hold is proportionate to the number of hosts in the VxLAN, and this can result in scaling challenges due to the routing limits of an application-specific integrated circuit (ASIC) (e.g., the size of the routing table in the ASIC).

SUMMARY

One embodiment provides a system which facilitates scaling of routing in an EVPN. During operation, the system determines, in an Ethernet Virtual Private Network (EVPN), a plurality of virtual tunnel endpoints (VTEPs) coupled to a plurality of subnets, wherein a respective subnet includes one or more hosts, wherein a first VTEP is configured with a first number of host routes for a first subnet coupled to a second VTEP, and wherein each of the first number of host routes corresponds to a host residing in the first subnet. Responsive to detecting that a total number of routes configured on the first VTEP exceeds a first predetermined threshold, the system aggregates the first number of host routes by replacing the first number of host routes with a first prefix route which indicates the first subnet. A VTEP can be configured based on directly coupled hosts or based on host routes which are learnt for a given subnet, as described below in relation to FIGS. 1, 2A, and 2B. In this instance, the first VTEP is configured based on the first number of host routes learnt for the first subnet coupled to the second VTEP.

In some embodiments, the system aggregates the first number of host routes by: configuring, in the first VTEP, the first prefix route; and subsequent to configuring the first prefix route, removing, in the first VTEP, the first number of host routes for the first subnet coupled to the second VTEP.

In some embodiments, the first VTEP is further configured with a second number of host routes for the first subnet coupled to a third VTEP, i.e., the first VTEP is further configured based on the second number of host routes learnt for the first subnet coupled to the third VTEP. Responsive to detecting that the total number of routes configured (i.e., learnt) on the first VTEP exceeds the first predetermined threshold, and responsive to determining that the first number is greater than the second number: the system aggregates the first number of host routes by replacing the first number of host routes with the first prefix route which indicates the first subnet coupled to the second VTEP.

In some embodiments, the system monitors the total number of routes configured (i.e., learnt) on the first VTEP. Responsive to detecting that the total number of routes configured (i.e., learnt) on the first VTEP exceeds the first predetermined threshold: the system determines that the second number is greater than the first number; the system reconfigures, in the first VTEP, the first number of host routes for the first subnet coupled to the second VTEP; the system removes the first prefix route from the first VTEP; and the system aggregates the second number of host routes by replacing the second number of host routes with a second prefix route which indicates the first subnet coupled to the third VTEP.

In some embodiments, the system aggregates the second number of host routes by: configuring, in the first VTEP, the second prefix route; and subsequent to configuring the second prefix route, removing, in the first VTEP, the second number of host routes for the first subnet coupled to the third VTEP.

In some embodiments, the EVPN is based on a symmetric integrated routing and bridging (IRB) protocol, and a host is represented by a host route in hardware associated with a VTEP.

In some embodiments, the first predetermined threshold is based on a size of a routing table in hardware associated with the first VTEP or a total number of routes supported by the hardware associated with the first VTEP.

In some embodiments, aggregating the first number of host routes is performed by the first VTEP further in response to detecting that a total number of host routes configured (i.e., learnt) for the first subnet on the first VTEP exceeds a second or a third predetermined threshold.

In some embodiments, the second predetermined threshold is based on a maximum number of host routes which can be configured (i.e., learnt) for the first subnet, and the third predetermined threshold is based on a total number of routes supported by hardware associated with the first VTEP divided by a total number of subnets configured (i.e., learnt) on the first VTEP.

In some embodiments, the first VTEP is directly coupled to one or more subnets, and the first VTEP does not aggregate host routes for the one or more directly coupled subnets.

BRIEF DESCRIPTION OF THE FIGURES

FIG. 2A illustrates a configuration for an exemplary sequence flow, in accordance with an embodiment of the present application.

FIG. 2B illustrates a detailed configuration for an exemplary sequence flow corresponding to the configuration in FIG. 2A, in accordance with an embodiment of the present application.

FIG. 2C illustrates a detailed configuration corresponding to FIG. 2B in response to a first event in the sequence flow, in accordance with an embodiment of the present application.

FIG. 2D illustrates a detailed configuration corresponding to FIG. 2C in response to a second event in the sequence flow, in accordance with an embodiment of the present application.

FIG. 2E illustrates a detailed configuration corresponding to FIG. 2D in response to a third event in the sequence flow, in accordance with an embodiment of the present application.

FIG. 2F illustrates a detailed configuration corresponding to FIG. 2E in response to a fourth event in the sequence flow, in accordance with an embodiment of the present application.

FIG. 2G illustrates a detailed configuration corresponding to FIG. 2F in response to a fifth event in the sequence flow, in accordance with an embodiment of the present application.

In the figures, like reference numerals refer to the same figure elements.

DETAILED DESCRIPTION

Figure 1:
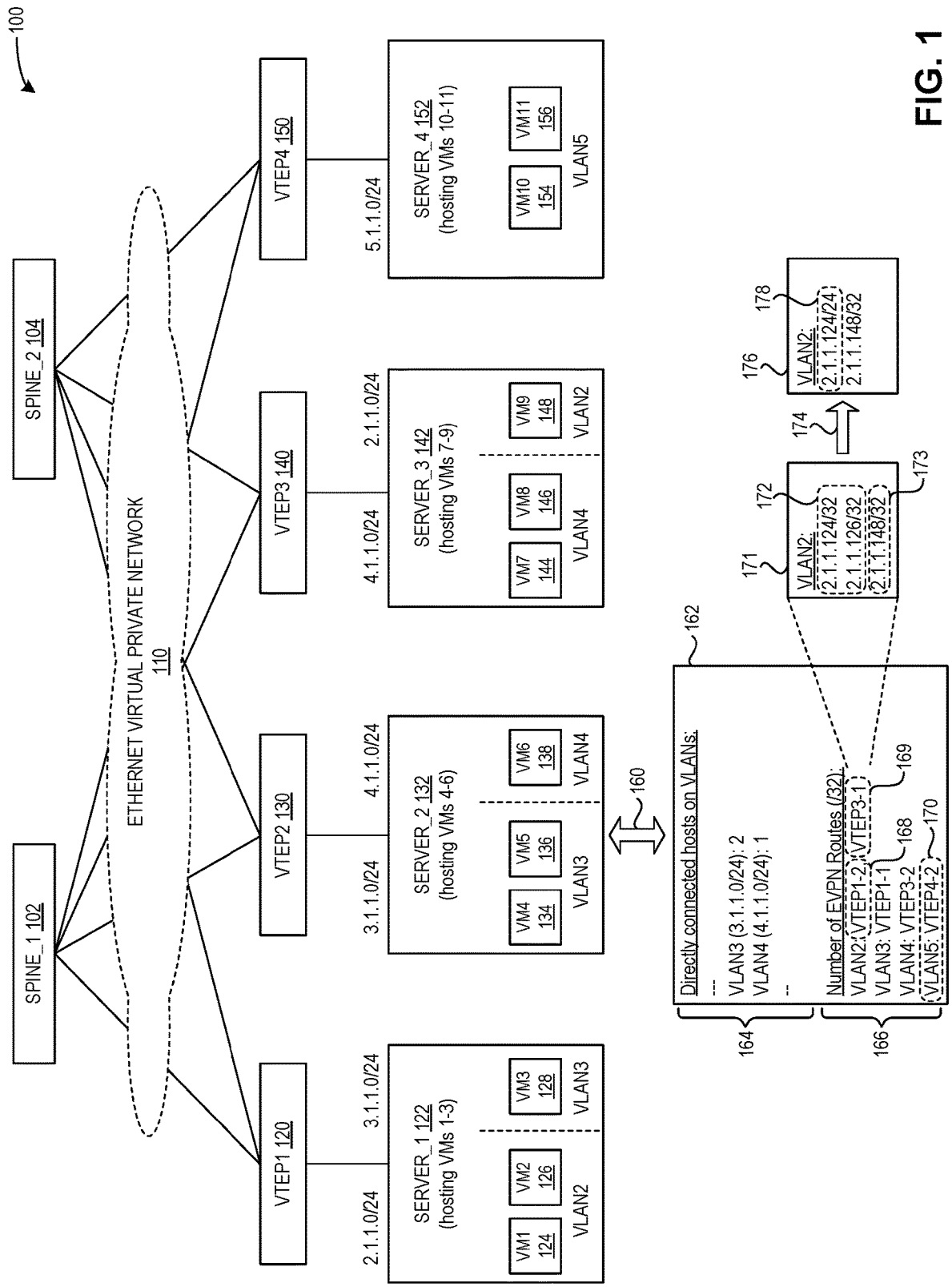
FIG. 1 illustrates an exemplary environment which facilitates scaling of routing in an EVPN, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein address the scaling challenges due to the size of the ASIC routing table by providing a system which performs route aggregation to optimize the number of host routes configured on VTEP by configuring a prefix route for a particular subnet.

As described above, in Symmetric-IRB, each VTEP only needs to be configured with VNIs for its hosted VLANs (e.g., local VNIs). However, the number of routes that each VTEP can hold is proportionate to the number of hosts in the VxLAN, and this can result in scaling challenges due to the routing limits of an ASIC (e.g., the size of the routing table in the ASIC). In an EVPN, the system may use RouteType-5 (RT-5) routes (e.g., prefix routes), which allows a VTEP in the EVPN to inject external routes into the VxLAN and to represent hosts on a subnet as a prefix route. Using RT-5 EVPN routes in Symmetric-IRB can thus optimize the routing scale requirements in a VxLAN.

One current solution to reduce the number of routes programmed in the hardware is lazy route programming. In this approach, EVPN host routes are not installed in the ASIC when the EVPN route is first received by a VTEP. Instead, a respective EVPN host route is only installed in the ASIC when the VTEP receives traffic destined for the respective EVPN host route (e.g., for that host). Once the host route is installed on the VTEP, the system can monitor the traffic to that host, and upon cessation of the traffic to that host for a predetermined time period (e.g., a configured timeout), the system can remove the host route from the ASIC, and only install the host route again when additional traffic is received for that host. This solution may provide optimization in campus and enterprise deployments where EVPN-VxLAN is used, because there is generally less east-west traffic in these deployments and not all connected hosts would be active at all times.

However, in data center deployments, with heavy east-west traffic and many constantly active connected hosts, the lazy route programming approach, which provides an optimization based on the traffic pattern, may not achieve an efficient optimization.

The embodiments described herein can achieve an optimization in campus/enterprise deployments, data center deployments, and other deployments, by providing a system which performs route aggregation on host routes configured on a VTEP by configuring prefix routes for subnets based on various thresholds. If a subnet is exclusive to a single VTEP, the system can represent all the hosts in the subnet as a single prefix route, e.g., via an EVPN RT-5 route. If a subnet is not exclusive to a single VTEP and is instead present on multiple VTEPs, the system can represent each host belonging to the subnet as host routes, e.g., via EVPN RT-2 routes. An exemplary environment depicting a subnet exclusive to a single VTEP and a subnet present on multiple VTEPs is described below in relation to FIG. 1.

In the embodiments described, the system can determine, in an EVPN, a plurality of VTEPs coupled to a plurality of subnets. A respective subnet can include one or more hosts. For example, a first VTEP can be coupled to a plurality of subnets. The first VTEP can also be configured with a first number of host routes for a first subnet coupled to a second VTEP, i.e., configured based on host routes which are learnt for the first subnet coupled to the second VTEP. The system can detect a triggering event, e.g.: when the total number of host routes in the ASIC reaches a first predetermined threshold, such as 90% of a hardware limit; when the total number of host routes in the first subnet reaches a second predetermined threshold, such as 90% of a maximum number of hosts per subnet; or when the total number of host routes in the first subnet exceeds a third predetermined threshold, such as a total number of host routes supported by the hardware divided by the total number of subnets configured on the first VTEP. In response to detecting the triggering event, the system can perform local aggregation for each subnet which has only EVPN host routes. For example, the system can replace the learnt EVPN host routes for the first subnet coupled to the second VTEP with a first prefix route. The next-hop of the prefix route can be the second VTEP. An exemplary route aggregation is described below in relation to FIGS. 1, 2C, and 3.

In some embodiments, the first VTEP can be further configured with a second number of host routes for the same first subnet coupled to a third VTEP, i.e., configured based on host routes which are learnt for the first subnet coupled to the third VTEP. Based on a triggering event (as described above), the system can determine that the first number is greater than the second number, and can subsequently perform the local aggregation by replacing the EVPN host routes for the first subnet coupled to the second VTEP with the first prefix route. That is, the next-hop of the prefix route can be the VTEP that has the greatest number of hosts for the subnet (in this case, the second VTEP). An exemplary route aggregation, including a comparison and selection of a prefix route, is described below in relation to FIGS. 2C, 2D, 2E, and 4A.

The system can monitor the total number of routes configured (i.e., learnt) on the first VTEP. Over a period of time, the optimization performed for the first VTEP may no longer be optimal as the second number of host routes (for the first subnet coupled to the third VTEP) may increase on the third VTEP. Based on a triggering event (as described above), the system can determine that the second number is now greater than the first number, and can subsequently perform a re-optimization of the local aggregation. The system can perform the following operations: reconfigure, in the first VTEP, the first number of host routes for the first subnet coupled to the second VTEP; remove the first prefix route from the first VTEP; and aggregate the second number of host routes by replacing the second number of host routes with a second prefix route which indicates the first subnet coupled to the third VTEP. An exemplary re-optimization of a route aggregation, including a comparison and selection of a prefix route, is described below in relation to FIGS. 2F and 4B.

If a VTEP is configured to export a prefix route (e.g., a RT-5 route) for a connected subnet, the system does not need to perform optimization for that connected subnet. To ensure zero traffic loss during optimization, as part of replacing the host routes, the system can configure an aggregated prefix route prior to removing the host routes. Each subnet on a given VTEP can only have one aggregated route, to ensure that no conflicting routes are installed, as described below in relation to FIGS. 2C, 2D, 2E, and 2F. If a subnet is optimized (e.g., with an RT-5 prefix route) on a VTEP, any RT-5 prefix route received for that subnet will not be programmed into the hardware. Furthermore, host moves from one VTEP to another VTEP do not affect the route optimization, and vice versa. That is, the route optimization is not affected by host moves from one VTEP to another VTEP, as described below in relation to FIG. 2G.

Thus, by providing a system which aggregates host routes based on various thresholds, the embodiments described herein can optimize the number of host routes configured on a VTEP. This optimization can include replacing host routes with a prefix route, and can further include re-optimizing host routes based on changes to the hosts through the system (e.g., adding, removing, and moving host routes from one VTEP to another). The described embodiments can thus provide a technical solution to the technological problem of the scaling challenges associated with hardware limits, e.g., the limited size of the ASIC routing table.

Exemplary Environment which Facilitates Scaling of Routing in an EVPN

FIG. 1 illustrates an exemplary environment 100 which facilitates scaling of routing in an EVPN, in accordance with an embodiment of the present application. Environment 100 can include spines switches which communicate over an EVPN with leaf switches, which communicate with servers or server nodes. A leaf switch can include a VTEP; a server can host a plurality of virtual machines or hosts; and the hosts may include groups of hosts which belong to a particular subnet or VLAN.

For example, environment 100 can include: a spine_1 102; a spine_2 104; a VTEP1 120; a VTEP2 130; a VTEP3 140; and a VTEP4 150. Spine_1 102 and spine_2 104 can communicate with VTEP1 120, VTEP2 130, VTEP3 140, and VTEP4 150 via an EVPN 110.

VTEP1 120 can be coupled to a server_1 122, which can host a VM1 124, a VM2 126, and a VM3 128. In server_1 122, a subnet indicated by VLAN2 can include hosts VM1 124 and VM2 126, while a subnet indicated by VLAN3 can include host VM3 128. VTEP2 130 can be coupled to a server_2 132, which can host a VM4 134, a VM5 136, and a VM6 138. In server_2 132, a subnet indicated by VLAN3 can include hosts VM4 134 and VM5 136, while a subnet indicated by VLAN4 can include host VM6 138. VTEP3 140 can be coupled to a server_3 142, which can host a VM7 144, a VM8 146, and a VM9 148. In server_3 142, a subnet indicated by VLAN4 can include hosts VM7 144 and VM8 146, while a subnet indicated by VLAN2 can include host VM9 148. VTEP4 150 can be coupled to a server_4 152, which can host a VM10 154 and a VM11 156. In server_4 152, a subnet indicated by VLAN5 can include hosts VM10 154 and VM11 156.

Each VTEP can be coupled or connected to hosts on VLANs (e.g., configured based on directly coupled hosts), and can also be configured with EVPN host routes which correspond to hosts residing on subnets of the other VTEPs of environment 100 (e.g., configured based on learnt host routes). For example, configuration information 162 associated with (160) VTEP2 130 can depict the following directly connected hosts on VLANs (in a section 164): two hosts (VM4 134 and VM5 136) on subnet VLAN3 (indicated as 3.1.1.0/24); and one host (VM6 138) on subnet VLAN4 (indicated as 4.1.1.0/24). Configuration information 162 for VTEP2 130 can also depict the number of learnt /32 EVPN host routes configured on VTEP2 130 (in a section 166): for subnet VLAN2, two hosts (VM1 124 and VM2 126) are indicated with VTEP1 as the next hop (element 168: "VTEP1-2"), and one host (VM9 148) is indicated with VTEP3 as the next hop (element 169: "VTEP3-1").

Recall that in symmetric-IRB, if a subnet is exclusive to a single VTEP, then all the hosts in the subnet can be represented by a single prefix route (e.g., an EVPN RT-5 route). For example, VLAN5 is exclusive to VTEP4 150. Because the subnet (VLAN5) is hosted on a single VTEP (VTEP4 150), VTEP4 150 can advertise a prefix route (RT-5) to represent all the hosts which belong to VLAN5. Thus, this prefix route (e.g., 5.1.1.0/24) can be configured or installed on each of VTEP1 120, VTEP2 130, and VTEP3 140, with VTEP4 150 as the next hop. Note that section 166 of configuration information 162 for VTEP2 130 depicts individual host routes (and not a single prefix route) for the two hosts (VM10 154 and VM11 156) on subnet VLAN5 with a next hop of VTEP4 150 (element 170: "VLAN5: VTEP4-2").

Additionally, in symmetric-IRB, if a subnet is present on multiple VTEPs, each host which belongs to that subnet can be represented as a host route (e.g., an EVPN RT-2 route). Each host can be installed as a /32 host route (or /128 for IPv6) in the other VTEPs. As described above, VLAN2 is present on both VTEP1 120 and VTEP3 140, so all the hosts which belong to VLAN2 (i.e., VM1 124, VM2 126, and VM9 148) can be represented by a host route (RT-2) (elements 168 and 169). On VTEP2, the host routes can be installed or configured as /32 host routes, as shown in an element 171. For example: for VM1 124, the host route can be 2.1.1.124/32 with VTEP1 120 as the next hop (first line of element 172); for VM2 126, the host route can be 2.1.1.126/32 with VTEP1 120 as the next hop (second line of element 172); and for VM9 148, the host route can be 2.1.1.148/32 with VTEP3 140 as the next hop (element 173).

Installing the /32 host routes as prefixes may consume a significant amount of resources related to routing in the hardware, because each host is represented as an individual route in the ASIC. As a result, the number of hosts which can be included in a subnet in an architecture such as environment 100 is constrained to and can be limited by the size of the ASIC's routing table.

The embodiments described herein provide a system which addresses the challenges associated with the hardware limitations by performing route aggregation, to optimize the number of host routes configured on a VTEP by configuring a prefix route for a particular subnet. The system can determine to perform local aggregation for each subnet which has only EVPN host routes, by replacing the host routes with a single prefix route. The system can select the VTEP with the greatest number of hosts for the subnet, and set the selected VTEP as the next-hop for the prefix route.

For example, in environment 100, VTEP2 130 is configured for VLAN2 with two hosts on VTEP1 120 (as shown by element 168) and one host on VTEP3 140 (as shown by element 169). The system can determine to perform local aggregation for VLAN2 (via an operation 174). Since there are two ("a first number") /32 prefixes pointing to VTEP1 120 (as shown by element 172) and one ("a second number") /32 prefix pointing to VTEP3 140 (as shown by element 173), and because the first number (two) is greater than the second number (one), the system can replace the two /32 prefixes pointing to VTEP1 120 with a single combined /24 prefix route (as shown by an element 178).

Operation 174 is provided as an example of route aggregation. The embodiments described herein can also perform this route aggregation in response to a detecting a triggering condition. The system can monitor the total number of routes configured on a given VTEP, and can also monitor the total number of host routes configured for a given subnet on a given VTEP. The triggering condition can include detecting whether the monitored total number of routes configured on a given VTEP has exceeded a first predetermined threshold (e.g., 90% of the maximum number of host routes based on a hardware limit of the ASIC routing table). The triggering condition can also include detecting whether the monitored total number of host routes configured for a given subnet on a given VTEP has exceeded a second predetermined threshold (e.g., 90% of the maximum number of hosts which can be held by the given subnet). The triggering condition can further include detecting whether the monitored total number of host routes configured for a given subnet on a given VTEP has exceeded a third predetermined threshold (e.g., a total number of host routes supported by the hardware divided by the total number of subnets configured on the given VTEP).

Exemplary Sequence Flow which Facilitates Scaling of Routing in an EVPN

FIG. 2A illustrates a configuration 200 for an exemplary sequence flow, in accordance with an embodiment of the present application. Configuration 200 can include three VTEPs, which are each coupled to a plurality of subnets. VTEP1 202 can be coupled to: VLAN2 (which can be indicated by and advertised to the other VTEPs with a prefix route of 2.1.0.0/18); and VLAN3 (which can be indicated by and advertised to the other VTEPs with a prefix route of 3.1.0.0/18). VTEP2 204 can be coupled to: VLAN3 (which can be indicated by and advertised to the other VTEPs with a prefix route of 3.1.0.0/18); VLAN4 (which can be indicated by and advertised to the other VTEPs with a prefix route of 4.1.0.0/18); and VLAN5 (which can be indicated by and advertised to the other VTEPs with a prefix route of 5.1.0.0/18). VTEP3 206 can be coupled to: VLAN2 (which can be indicated by and advertised to the other VTEPs with a prefix route of 2.1.0.0/18); VLAN4 (which can be indicated by and advertised to the other VTEPs with a prefix route of 4.1.0.0/18); and VLAN5 (which can be indicated by and advertised to the other VTEPs with a prefix route of 5.1.0.0/18).

For the exemplary sequence flow depicted below in FIGS. 2B-2G for the configuration of FIG. 2A, the system can use a threshold limit of 90%. The hardware limit for the number of routes on a single VTEP can be 30,000. Thus, the hardware threshold limit for the ASIC is 27,000 (which is 90% of 30000). The /18 subnet can be configured as the aggregation mask. Since the /18 subnet can hold up to 16,384 hosts, the threshold limit for the subnet is 14,745 (which is 90% of 16384). Finally, the VTEPs of configuration 200 are deployed in a Symmetric-IRB architecture with distributed gateways for each subnet on all the VTEPs.

FIG. 2B illustrates a detailed configuration 210 for an exemplary sequence flow corresponding to the configuration in FIG. 2A, in accordance with an embodiment of the present application. Configuration 210 can indicate directly connected hosts on VLANs (row 212) and the number of learnt EVPN routes (/32) for each of the three VTEPs (row 214). For example, on VTEP1 202, the directly connected hosts on VLANs include 4000 hosts on VLAN2 and 5000 hosts on VLAN3. The number of EVPN routes on VTEP1 can include: for VLAN2, 5000 host routes configured for VTEP3; for VLAN3, 9000 host routes configured for VTEP2; for VLAN4, 5000 host routes configured for VTEP2 and 7000 host routes configured for VTEP3; and for VLAN5, 1000 host routes configured for VTEP2 and 0 host routes configured for VTEP3. The total number of EVPN host routes for VTEP1 202 is: 27,000 (5,000+9,000+5,000+7,000+1,000).

FIG. 2C illustrates a detailed configuration 220 corresponding to FIG. 2B in response to a first event in the sequence flow, in accordance with an embodiment of the present application. Configuration 220 can indicate directly connected hosts on VLANs (row 221), the number of learnt EVPN routes (/32) for each of the three VTEPs (row 222), the number of routes in ASIC (row 223), and notes 224 (row 224). Notes 224 indicate that the first event is adding one host to VLAN4 on VTEP2 204. Adding one host to VLAN4 on VTEP2 204 can result in the following two changes in row 222: on VTEP1 202, for VLAN4, there are now 5,001 (in bold) host routes configured for VTEP2, which brings the total number of routes (as shown by an element 225) to 27001; and on VTEP3 206, for VLAN4, there are now 5,001(in bold) host routes configured for VTEP2, which brings the total number of routes to 24,001. Element 225 indicates a triggering event (e.g., trigger 225), because 90% of the ASIC limit is reached at VTEP1 202 (because 27,001>27,000).

In response to detecting trigger 225, the system can optimize VTEP1 202 for VLAN4 and VLAN5, i.e., the subnets which have only EVPN /32 host routes. That is, the system can determine on VTEP1 202 that VLAN4 and VLAN5 have only EVPN host routes, and can also determine on VTEP1 202 that VLAN2 and VLAN3 have directly connected hosts (i.e., do not have only EVPN host routes). The system can determine to aggregate the routes with the greatest number of hosts for the given subnet (e.g., VLAN4 and VLAN5). That is, for VLAN4, the system can determine to aggregate the 7,000/32 routes configured for VTEP3 (element 226), and replace those 7,000 routes with an optimized /18 prefix route (element 228). For VLAN5, the system can also determine to aggregate the 1,000/32 routes configured for VTEP2, and replace those 1,000 routes with an optimized /18 prefix route (element 229). These optimizations result in 19,005 routes in ASIC (optimized), which is ~63% of the hardware threshold limit of 30,000, and a total number of routes optimized as 7,998 (element 230).

FIG. 2D illustrates a detailed configuration 240 corresponding to FIG. 2C in response to a second event in the sequence flow, in accordance with an embodiment of the present application. Configuration 240 can indicate directly connected hosts on VLANs (row 241), the number of learnt EVPN routes (/32) for each of the three VTEPs (row 242), the number of routes in ASIC (row 243), and notes 244 (row 244). Notes 244 indicate that the second event is adding, on VTEP3 206, 4,000 hosts to VLAN2 and 2001 hosts to VLAN4. Adding these hosts on VTEP3 206 can result in the following four changes in row 242: on VTEP1 202, for VLAN2, there are now 9,000 (in bold) host routes configured for VTEP3; on VTEP1 202 for VLAN4, there are now 9,001 host routes configured for VTEP3; on VTEP2 204 for VLAN2, there are now 9,000 (in bold) host routes configured for VTEP3; and on VTEP2 204, for VLAN4, there are now 9,001 (in bold) host routes configured for VTEP3. These additions bring the total number of EVPN routes in VTEP1 202 to 33,002 and in VTEP2 204 to 27001. Element 245 indicates a triggering event (e.g., trigger 245), because 90% of the ASIC limit is reached at VTEP2 204 (because 27,001>27,000).

In response to detecting trigger 245, the system can optimize VTEP2 for VLAN2, i.e., the subnet which has only EVPN /32 host routes. That is, the system can determine on VTEP2 204 that VLAN2 has only EVPN host routes, and can also determine on VTEP2 204 that VLAN3, VLAN4, and VLAN5 have directly connected hosts (i.e., do not have only EVPN host routes). The system can determine to aggregate the routes with the greatest number of hosts for the given subnet (VLAN2). That is, for VLAN2, the system can determine to aggregate the 9000/32 routes configured for VTEP3 (element 246), and replace those 9000 routes with an optimized /18 prefix route (element 247). This optimization results in 18,005 routes in ASIC (optimized), which is ~60% of the hardware threshold limit of 30,000, and a total number of routes optimized as 8,999 (element 248).

For VTEP1 202, note that while the second event of FIG. 2D again results in the total number of EVPN host routes exceeding the hardware limit threshold (because 33,002 is greater than 27,000), the first optimization shown in FIG. 2C remains. That is, the additional 2,001 routes added to the configuration of VLAN4 for VTEP3 is included in the previously configured /18 prefix route (element 228 of FIG. 2C). This results in the total number of routes in the ASIC as 23,005, which is ~77% of 30,000, and a total number of routes optimized as 9999 (in bold) (element 249) (e.g., 7,998+2,001).

FIG. 2E illustrates a detailed configuration 250 corresponding to FIG. 2D in response to a third event in the sequence flow, in accordance with an embodiment of the present application. Configuration 250 can indicate directly connected hosts on VLANs (row 251), the number of learnt EVPN routes (/32) for each of the three VTEPs (row 252), the number of routes in ASIC (row 253), and notes 254 (row 254). Notes 254 indicate that the third event is adding 3000 hosts to VLAN2 on VTEP1 202. Adding 3000 hosts to VLAN2 on VTEP1 202 can result in the following two changes in row 252: on VTEP2 204, for VLAN2, there are now 7,000 (in bold) host routes configured for VTEP1, which brings the total number of routes for subnet VLAN2 to 16,000 (in bold) (as shown by an element 259); and on VTEP3 206, for VLAN2, there are now 7,000 (in bold) host routes configured for VTEP1, which brings the total number of routes to 27,001 (as shown by an element 255). Element 255 indicates a triggering event (e.g., trigger 255), because 90% of the ASIC limit is reached at VTEP3 206 (because 27,001>27,000). Element 259 also indicates a triggering event (e.g., trigger 259), because 90% of the subnet limit is reached for VLAN2 on VTEP2 204 (because 16,000>14,745).

In response to detecting trigger 255, the system can optimize VTEP3 for VLAN3, i.e., the subnet which has only EVPN /32 host routes. That is, the system can determine on VTEP3 206 that VLAN3 has only EVPN host routes, and can also determine on VTEP3 206 that VLAN2, VLAN4, and VLAN5 have directly connected hosts (i.e., do not have only EVPN host routes). The system can determine to aggregate the routes with the greatest number of hosts for the given subnet (e.g., VLAN3). That is, the system can determine to aggregate the 9,000/32 routes configured for VTEP2 (element 256), and replace those 9,000 routes with an optimized /18 prefix route (element 257). This optimization results in 18,005 routes in ASIC (optimized), which is ~63% of the hardware threshold limit of 30,000, and a total number of routes optimized as 9,000 (in bold) (element 258). In response to detecting trigger 259, the system determines that VTEP2 204 is already optimized for VLAN2, and no further optimizations are performed.

FIG. 2F illustrates a detailed configuration 260 corresponding to FIG. 2E in response to a fourth event in the sequence flow, in accordance with an embodiment of the present application. Configuration 260 can indicate directly connected hosts on VLANs (row 261), the number of learnt EVPN routes (/32) for each of the three VTEPs (row 262), the number of routes in ASIC (row 263), and notes 264 (row 264). Notes 264 indicate that the fourth event is adding 8,000 hosts to VLAN3 on VTEP1 202 and removing 6,000 hosts from VLAN3 on VTEP2 204. This fourth event can result in the following four changes in row 262: on VTEP1 202, for VLAN3, there are now 3,000 host routes configured for VTEP2; on VTEP2 204 for VLAN3, there are now 13,000 host routes configured for VTEP1; and on VTEP3 206, for VLAN3, there are now 13,000 host routes configured for VTEP1 and 3,000 hosts configured for VTEP2. These changes bring the total number of EVPN routes in VTEP2 204 to 38,001 (element 265) and in VTEP3 206 to 29,001 (element 266).

Element 265 indicates a triggering event (e.g., trigger 265), because 90% of the ASIC limit is reached at VTEP2 204 (because 38,001>27,000). In response to detecting trigger 265, the system determines that VTEP2 204 is already optimized (as previously optimized for VLAN2), and that no further optimizations are possible.

Element 266 indicates a triggering event (e.g., trigger 266), because 90% of the ASIC limit is reached at VTEP3 206 (because 29,001>27,000). In response to detecting trigger 266, the system determines to re-optimize VTEP3 for VLAN3, by, e.g., reconfiguring or reprogramming the 3,000 /32 host routes for VTEP2 (element 269), removing the /18 prefix route for VTEP2 (element 257 of FIG. 2E), configuring a /18 prefix route for the 13,000 host routes on VTEP1 (element 268), and removing the 13,000 host routes for VTEP1 (element 267). This optimization results in 16,005 routes in ASIC (optimized), which is ~53% of the hardware threshold limit of 30,000, and a total number of routes optimized as 13,999 (in bold) (element 270).

FIG. 2G illustrates a detailed configuration 280 corresponding to FIG. 2F in response to a fifth event in the sequence flow, in accordance with an embodiment of the present application. Configuration 280 can indicate directly connected hosts on VLANs (row 281), the number of learnt EVPN routes (/32) for each of the three VTEPs (row 282), the number of routes in ASIC (row 283), and notes 284 (row 284). Notes 284 indicate that the fifth event is moving 5,000 hosts on VLAN2 from VTEP1 202 to VTEP3 206. This fifth event can result in the following four changes in row 282: on VTEP1 202, for VLAN2, there are now 14,000 host routes configured for VTEP3; on VTEP2 204, for VLAN2, there are now 2,000 host routes configured for VTEP1 and 14,000 host routes configured for VTEP3; and on VTEP3 206, for VLAN2, there are now 2,000 host routes configured for VTEP1. These changes bring the total number of EVPN routes in VTEP1 202 to 32,002, in VTEP2 204 to 38,001, and in VTEP3 206 to 24,001. No further optimization can be performed in any of the three VTEPs, so the system does not perform any route aggregation. That is, the fifth event results in no impact in aggregation. However, note that there is an increase in the number of routes optimized on VTEP2 204. That is, on VTEP2 204, due to the addition of the 5,000 EVPN host routes for VLAN2 to VTEP3, the number of routes optimized increases from 8,999 (in FIG. 2F) to 13,999 (element 285 in FIG. 2G).

Exemplary Method which Facilitates Scaling of Routing in an EVPN

Figure 3:
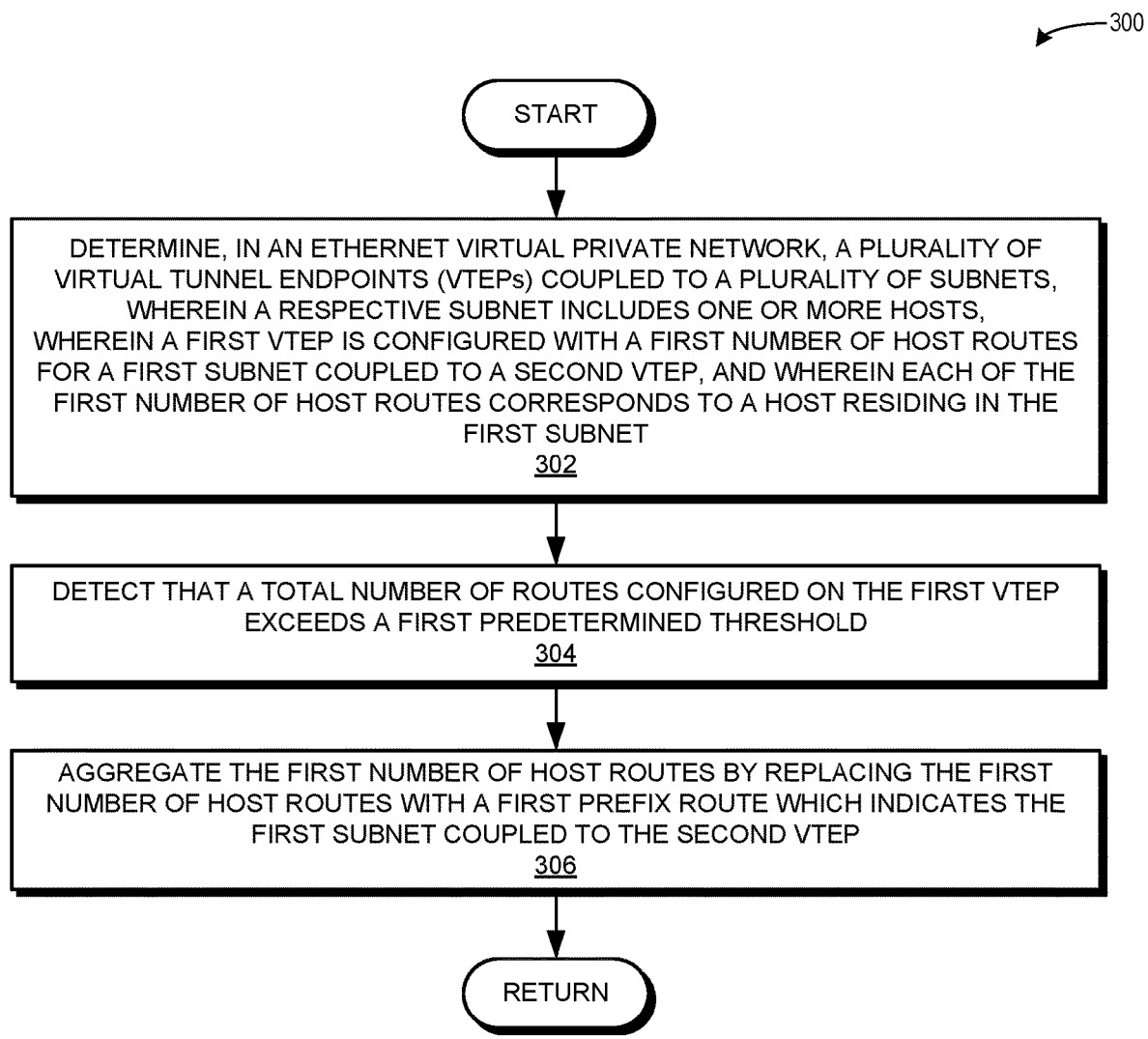
FIG. 3 presents a flowchart illustrating a method which facilitates scaling of routing in an EVPN, in accordance with an embodiment of the present application.

FIG. 3 presents a flowchart 300 illustrating a method which facilitates scaling of routing in an EVPN, in accordance with an embodiment of the present application. During operation, the system determines, in an Ethernet Virtual Private Network (EVPN), a plurality of virtual tunnel endpoints (VTEPs) coupled to a plurality of subnets, wherein a respective subnet includes one or more hosts, wherein a first VTEP is configured with a first number of host routes for a first subnet coupled to a second VTEP, and wherein each of the first number of host routes corresponds to a host residing in the first subnet (operation 302). As discussed above, the first VTEP is configured based on the first number of host routes learnt for the first subnet coupled to the second VTEP. The system detects that a total number of routes configured on the first VTEP exceeds a first predetermined threshold (operation 304). The system aggregates the first number of host routes by replacing the first number of host routes with a first prefix route which indicates the first subnet coupled to the second VTEP (operation 306).

Figure 4A:
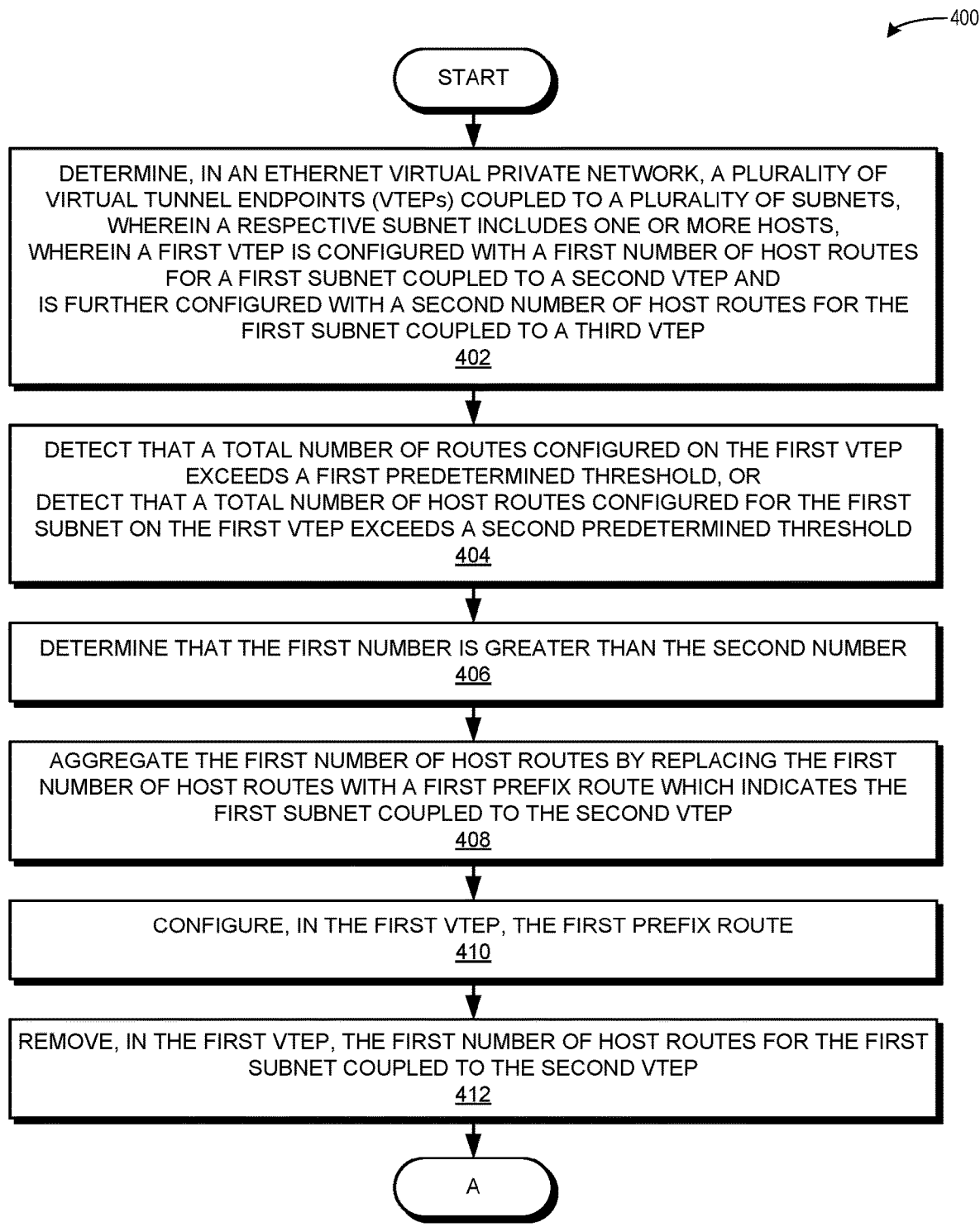
FIG. 4A presents a flowchart illustrating a method which facilitates scaling of routing in an EVPN, including optimization based on a number of host routes for a same subnet coupled to different VTEPs, in accordance with an embodiment of the present application.

FIG. 4A presents a flowchart 400 illustrating a method which facilitates scaling of routing in an EVPN, including optimization based on a number of host routes for a same subnet coupled to different VTEPs, in accordance with an embodiment of the present application. During operation, the system determines, in an Ethernet Virtual Private Network (EVPN), a plurality of virtual tunnel endpoints (VTEPs) coupled to a plurality of subnets, wherein a respective subnet includes one or more hosts, wherein a first VTEP is configured with a first number of host routes for a first subnet coupled to a second VTEP and is further configured with a second number of host routes for the first subnet coupled to a third VTEP (operation 402). Each of the first number of host routes corresponds to a host residing in the first subnet coupled to the second VTEP, and each of the second number of host routes corresponds to a host residing in the first subnet coupled to the third VTEP. The first VTEP is configured based on the first number of host routes learnt for the first subnet coupled to the second VTEP, and is further configured based on the second number of host routes learnt for the first subnet coupled to the third VTEP.

The system detects that a total number of routes configured (i.e., learnt) on the first VTEP exceeds a first predetermined threshold, or detects that a total number of host routes configured (i.e., learnt) for the first subnet on the first VTEP exceeds a second predetermined threshold (operation 404). The system can detect these trigger events or trigger conditions by monitoring the total number of routes configured (i.e., learnt) on the first VTEP or the first subnet (e.g., based on a predetermined threshold, as described above in relation to FIG. 1). In response to detecting the trigger event or condition, the system determines that the first number is greater than the second number (operation 406) and aggregates the first number of host routes by replacing the first number of host routes with a first prefix route which indicates the first subnet coupled to the second VTEP (operation 408). The system can perform this aggregation by configuring, in the first VTEP, the first prefix route (operation 410) and, subsequent to configuring the first prefix route, removing, in the first VTEP, the first number of host routes for the first subnet coupled to the second VTEP (operation 412). The operation continues at Label A of FIG. 4B.

Figure 4B:
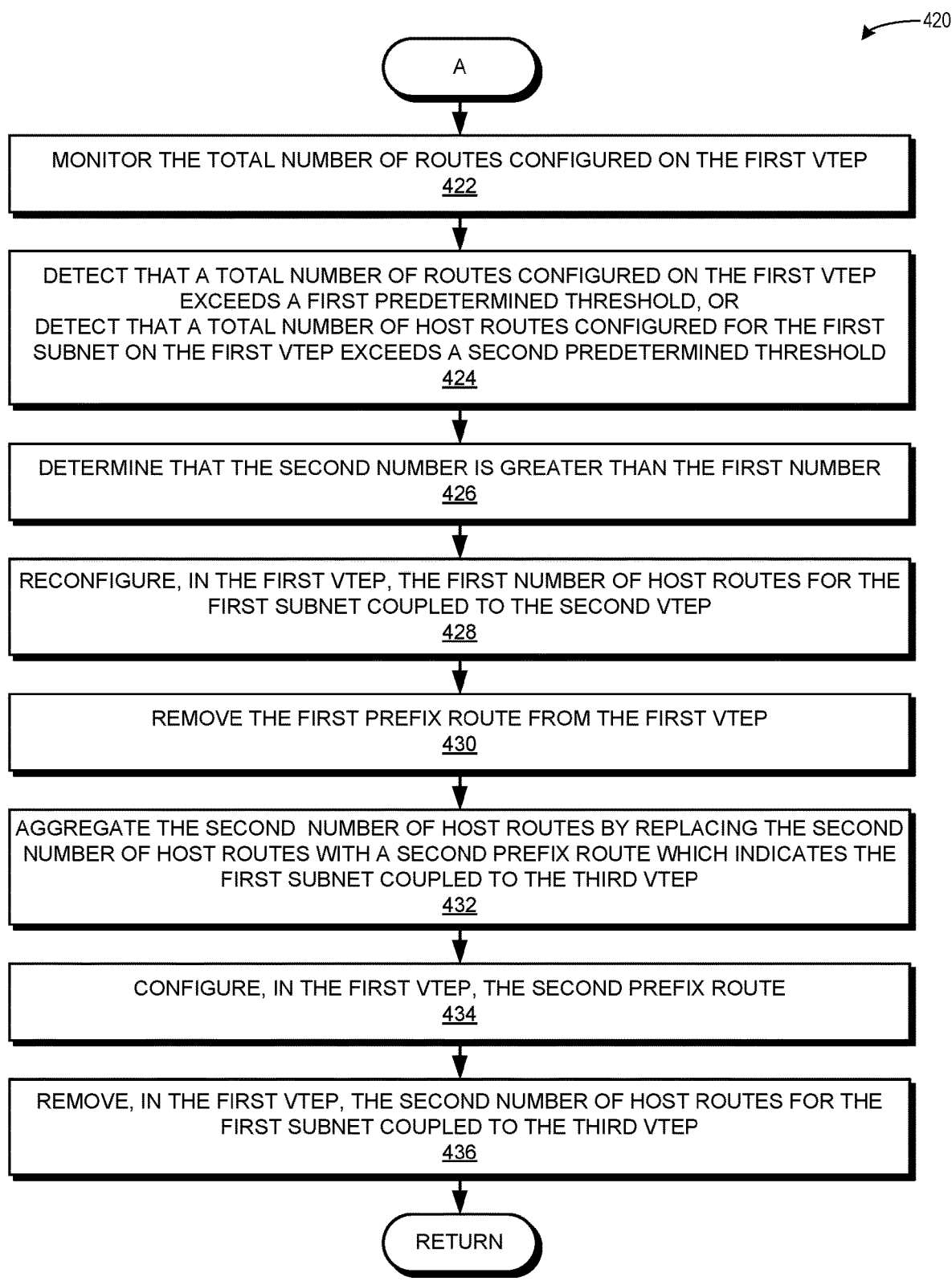
FIG. 4B presents a flowchart illustrating a method which facilitates scaling of routing in an EVPN, including a re-optimization based on a number of host routes for a same subnet coupled to different VTEPs, in accordance with an embodiment of the present application.

FIG. 4B presents a flowchart 420 illustrating a method which facilitates scaling of routing in an EVPN, including a re-optimization based on a number of host routes for a same subnet coupled to different VTEPs, in accordance with an embodiment of the present application. During operation, the system monitors the total number of routes configured (i.e., learnt) on the first VTEP (and the first subnet on the first VTEP) (operation 422). The system detects that a total number of routes configured (i.e., learnt) on the first VTEP exceeds a first predetermined threshold, or detects that a total number of host routes configured (i.e., learnt) for the first subnet on the first VTEP exceeds a second predetermined threshold (operation 424). The system determines that the second number is greater than the first number (operation 426), and performs a re-optimization procedure. For example, the system reconfigures, in the first VTEP, the first number of host routes for the first subnet connected to the second VTEP (operation 428), and removes the first prefix route from the first VTEP (operation 430). The system aggregates the second number of host routes by replacing the second number of host routes with a second prefix route which indicates the first subnet coupled to the third VTEP (operation 432). The system can perform this aggregation by configuring, in the first VTEP, the second prefix route (operation 434) and, subsequent to configuring the second prefix route, removing, in the first VTEP, the second number of host routes for the first subnet coupled to the third VTEP (operation 436).

Exemplary Computer System and Apparatus

Figure 5:
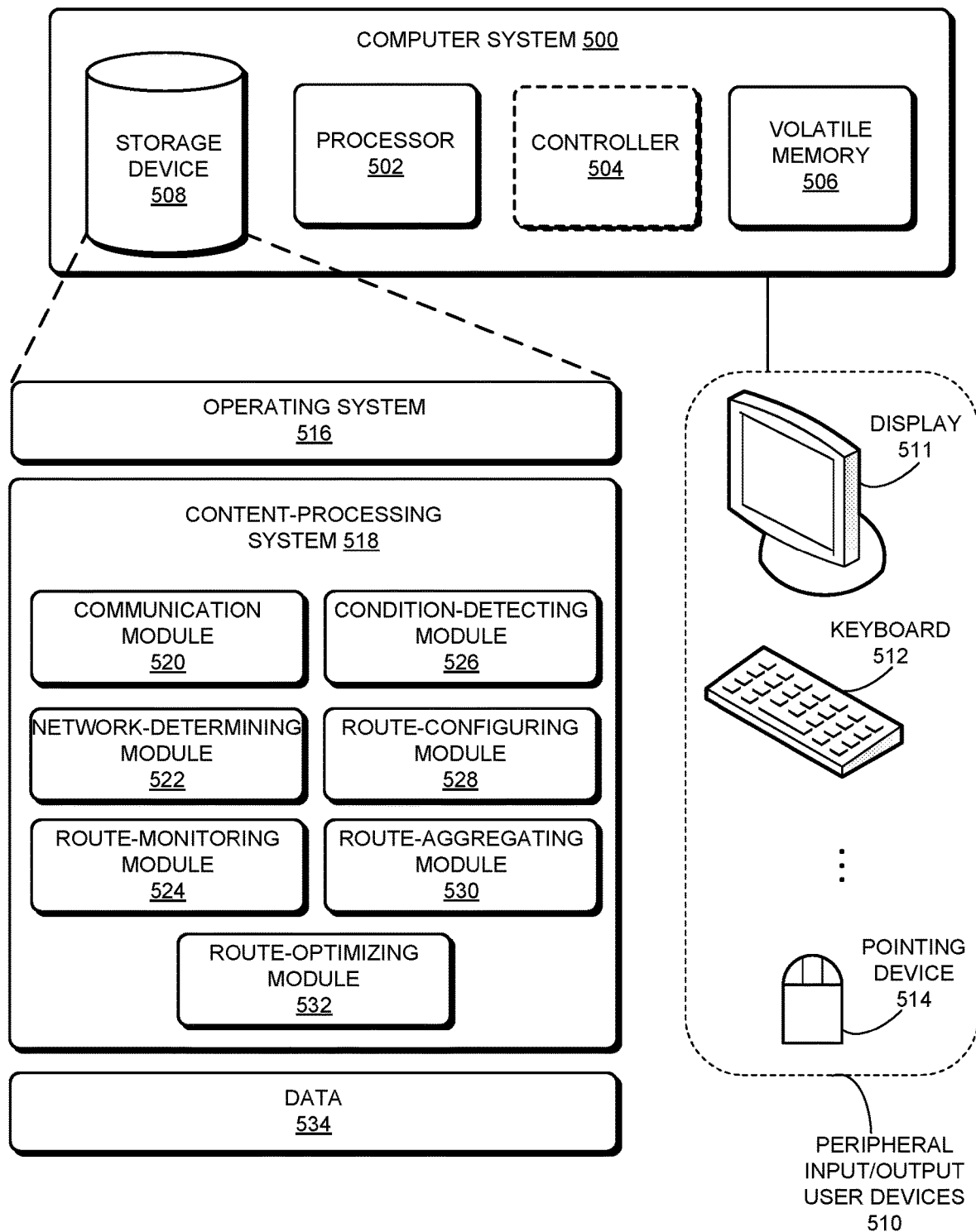
FIG. 5 illustrates an exemplary computer system which facilitates scaling of routing in an EVPN, in accordance with an embodiment of the present application.

FIG. 5 illustrates an exemplary computer system 500 which facilitates scaling of routing in an EVPN, in accordance with an embodiment of the present application. Computer system 500 includes a processor 502, a volatile memory 506, and a storage device 508. In some embodiments, computer system 500 can include a controller 504 (indicated by the dashed lines). Volatile memory 506 can include, e.g., random access memory (RAM), that serves as a managed memory, and can be used to store one or more memory pools. Storage device 508 can include persistent storage which can be managed or accessed via processor 502 (or controller 504). Furthermore, computer system 500 can be coupled to peripheral input/output (I/O) user devices 510, e.g., a display device 511, a keyboard 512, and a pointing device 514. Storage device 508 can store an operating system 516, a content-processing system 518, and data 534.

Content-processing system 518 can include instructions, which when executed by computer system 500, can cause computer system 500 or processor 502 to perform methods and/or processes described in this disclosure. Specifically, content-processing system 518 can include instructions for receiving and transmitting data packets, including data associated with determining a network, and data associated with monitoring, configuring, aggregating, or optimizing a route (communication module 520).

Content-processing system 518 can further include instructions for determining, in an Ethernet Virtual Private Network (EVPN), a plurality of virtual tunnel endpoints (VTEPs) coupled to a plurality of subnets, wherein a respective subnet includes one or more hosts, wherein a first VTEP is configured with a first number of host routes for a first subnet coupled to a second VTEP, and wherein each of the first number of host routes corresponds to a host residing in the first subnet (network-determining module 522). Content-processing system 518 can include instructions for detecting that a total number of routes configured on the first VTEP exceeds a first predetermined threshold (condition-detecting module 528). Content-processing system 518 can also include instructions for aggregating the first number of host routes by replacing the first number of host routes with a first prefix route which indicates the first subnet coupled to the second VTEP (route-aggregating module 530). Content-processing system 518 can include instructions for configuring, in the first VTEP, the first prefix route (route-configuring module 528) and, subsequent to configuring the first prefix route, removing, in the first VTEP, the first number of host routes for the first subnet coupled to the second VTEP (route-configuring module 528).

Content-processing system 518 can further include instructions for monitoring the total number of routes configured on the first VTEP (route-monitoring module 524). Content-processing system 518 can include instructions for detecting that the total number of routes configured on the first VTEP exceeds the first predetermined threshold (condition-detecting module 526). Content-processing system 518 can include instructions for: determining that the second number is greater than the first number; reconfiguring, in the first VTEP, the first number of host routes for the first subnet connected to the second VTEP; removing the first prefix route from the first VTEP; and aggregating the second number of host routes by replacing the second number of host routes with a second prefix route which indicates the first subnet coupled to the third VTEP (route-optimizing module 532, route-configuring module 528, and route-aggregating module 530).

Data 534 can include any data that is required as input or generated as output by the methods and/or processes described in this disclosure. Specifically, data 536 can store at least: an identifier of an EVPN, a VTEP, and a subnet; a host route; a prefix route; a VTEP configured with a number of host routes for a subnet coupled to another VTEP; an indicator of a host residing in a subnet; a total number of host routes; a total number of routes configured on a VTEP; a first predetermined threshold; a second predetermined threshold; a determination of a comparison of two numbers; a reconfigured host route; a removed host route; an installed or configured host route; an aggregated host route; an indicator of a subnet; an indicator of a Symmetric-IRB protocol; a VNI; information associated with an EVPN, a VLAN, a VxLAN, a VTEP, and a VNI; a maximum number of host routes which can be configured for a subnet; a size or a maximum size of a routing table in hardware associated with a VTEP; an indicator of whether a VTEP is connected to or coupled to a subnet.

Figure 6:
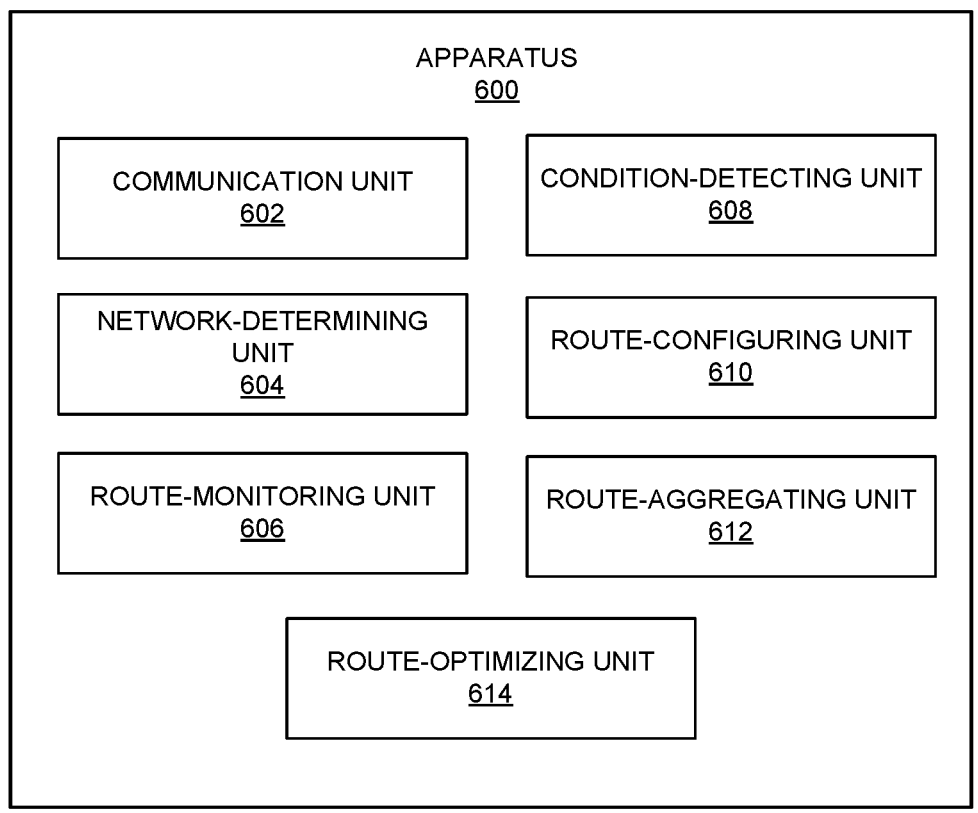
FIG. 6 illustrates an exemplary apparatus that facilitates scaling of routing in an EVPN, in accordance with an embodiment of the present application.

FIG. 6 illustrates an exemplary apparatus 600 that facilitates scaling of routing in an EVPN, in accordance with an embodiment of the present application. Apparatus 600 can comprise a plurality of units or apparatuses which may communicate with one another via a wired, wireless, quantum light, or electrical communication channel. Apparatus 600 may be realized using one or more integrated circuits, and may include fewer or more units or apparatuses than those shown in FIG. 6. Furthermore, apparatus 600 may be integrated in a computer system, or realized as a separate device or devices capable of communicating with other computer systems and/or devices.

Apparatus 600 may also include a non-volatile storage system or a memory management unit. Apparatus 600 can comprise modules or units 602-614 which are configured to perform functions or operations similar to modules 520-532 of computer system 500 of FIG. 5, including: a communication unit 602; a network-determining unit 604; a route-monitoring unit 606; a condition-detecting unit 608; a route-configuring unit 610; a route-aggregating unit 612, and a route-optimizing unit 614.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method, comprising:
   determining, in an Ethernet Virtual Private Network (EVPN), a plurality of virtual tunnel endpoints (VTEPs) coupled to a plurality of subnets,
   wherein a respective subnet includes one or more hosts,
   wherein a first VTEP is configured with a first number of host routes for a first subnet coupled to a second VTEP, and wherein each of the first number of host routes corresponds to a host residing in the first subnet; and
   responsive to detecting that a total number of routes configured on the first VTEP exceeds a first predetermined threshold:
      aggregating the first number of host routes by replacing the first number of host routes with a first prefix route which indicates the first subnet, wherein aggregating the first number of host routes is performed by the first VTEP further in response to detecting that a total number of host routes configured for the first subnet on the first VTEP exceeds one of:
         a second predetermined threshold based on a maximum number of host routes which can be configured for the first subnet, and
         a third predetermined threshold based on a total number of routes supported by hardware associated with the first VTEP divided by a total number of subnets configured on the first VTEP.

2. The method of claim 1, wherein aggregating the first number of host routes comprises:
   configuring, in the first VTEP, the first prefix route; and
   subsequent to configuring the first prefix route, removing, in the first VTEP, the first number of host routes for the first subnet coupled to the second VTEP.

3. The method of claim 1,
   wherein the first VTEP is further configured with a second number of host routes for the first subnet coupled to a third VTEP, and
   wherein responsive to detecting that the total number of routes configured on the first VTEP exceeds the first predetermined threshold, the method further comprises:
      responsive to determining that the first number is greater than the second number, aggregating the first number of host routes by replacing the first number of host routes with the first prefix route which indicates the first subnet coupled to the second VTEP.

4. The method of claim 3, further comprising:
   monitoring the total number of routes configured on the first VTEP; and
   responsive to detecting that the total number of routes configured on the first VTEP exceeds the first predetermined threshold:
      determining that the second number is greater than the first number;
      reconfiguring, in the first VTEP, the first number of host routes for the first subnet coupled to the second VTEP;
      removing the first prefix route from the first VTEP; and
      aggregating the second number of host routes by replacing the second number of host routes with a second prefix route which indicates the first subnet coupled to the third VTEP.

5. The method of claim 4, wherein aggregating the second number of host routes comprises:
   configuring, in the first VTEP, the second prefix route; and
   subsequent to configuring the second prefix route, removing, in the first VTEP, the second number of host routes for the first subnet coupled to the third VTEP.

6. The method of claim 1,
   wherein the EVPN is based on a symmetric integrated routing and bridging (IRB) protocol, and
   wherein a host is represented by a host route in hardware associated with a VTEP.

7. The method of claim 1,
   wherein the first predetermined threshold is based on a size of a routing table in hardware associated with the first VTEP or a total number of routes supported by the hardware associated with the first VTEP.

8. The method of claim 1,
   wherein the first VTEP is directly coupled to one or more subnets, and
   wherein the first VTEP does not aggregate host routes for the one or more directly coupled subnets.

9. A computer system, comprising:
   a processor; and
   a memory coupled to the processor and storing instructions which, when executed by the processor, cause the processor to perform a method, the method comprising:
      determining, in an Ethernet Virtual Private Network (EVPN), a plurality of virtual tunnel endpoints (VTEPs) coupled to a plurality of subnets,
      wherein a respective subnet includes one or more hosts,
      wherein a first VTEP is configured with a first number of host routes for a first subnet coupled to a second VTEP, and wherein each of the first number of host routes corresponds to a host residing in the first subnet; and
      responsive to detecting that a total number of routes configured on the first VTEP exceeds a first predetermined threshold:
         aggregating the first number of host routes by replacing the first number of host routes with a first prefix route which indicates the first subnet, wherein aggregating the first number of host routes is performed by the first VTEP further in response to detecting that a total number of host routes configured for the first subnet on the first VTEP exceeds one of:
            a second predetermined threshold based on a maximum number of host routes which can be configured for the first subnet, and
            a third predetermined threshold based on a total number of routes supported by hardware associated with the first VTEP divided by a total number of subnets configured on the first VTEP.

10. The computer system of claim 9, wherein aggregating the first number of host routes comprises:
    configuring, in the first VTEP, the first prefix route; and
    subsequent to configuring the first prefix route, removing, in the first VTEP, the first number of host routes for the first subnet coupled to the second VTEP.

11. The computer system of claim 9,
    wherein the first VTEP is further configured with a second number of host routes for the first subnet coupled to a third VTEP, and wherein responsive to detecting that the total number of routes configured on the first VTEP exceeds the first predetermined threshold, the method further comprises:

responsive to determining that the first number is greater than the second number, aggregating the first number of host routes by replacing the first number of host routes with the first prefix route which indicates the first subnet coupled to the second VTEP.

12. The computer system of claim 11, wherein the method further comprises:

monitoring the total number of routes configured on the first VTEP; and responsive to detecting that the total number of routes configured on the first VTEP exceeds the first predetermined threshold:

determining that the second number is greater than the first number;

reconfiguring, in the first VTEP, the first number of host routes for the first subnet coupled to the second VTEP;

removing the first prefix route from the first VTEP; and aggregating the second number of host routes by replacing the second number of host routes with a second prefix route which indicates the first subnet coupled to the third VTEP.

13. The computer system of claim 12, wherein aggregating the second number of host routes comprises:

configuring, in the first VTEP, the second prefix route; and subsequent to configuring the second prefix route, removing, in the first VTEP, the second number of host routes for the first subnet coupled to the third VTEP.

14. The computer system of claim 9, wherein the EVPN is based on a symmetric integrated routing and bridging (IRB) protocol, and wherein a host is represented by a host route in hardware associated with a VTEP.

15. The computer system of claim 9, wherein the first predetermined threshold is based on a size of a routing table in hardware associated with the first VTEP or a total number of routes supported by the hardware associated with the first VTEP.

16. The computer system of claim 9, wherein the first VTEP is directly coupled to one or more subnets, and wherein the first VTEP does not aggregate host routes for the one or more directly coupled subnets.

17. An apparatus, comprising:

a network-determining unit to determine, in an Ethernet Virtual Private Network (EVPN), a plurality of virtual tunnel endpoints (VTEPs) coupled to a plurality of subnets, wherein a respective subnet includes one or more hosts, wherein a first VTEP is configured with a first number of host routes for a first subnet coupled to a second VTEP, and wherein each of the first number of host routes corresponds to a host residing in the first subnet;

a route-monitoring unit to detect whether a total number of routes configured on the first VTEP exceeds a first predetermined threshold; and a route-aggregating unit to, responsive to the route- monitoring module detecting that a total number of routes configured on the first VTEP exceeds a first predetermined threshold, aggregate the first number of host routes by replacing the first number of host routes with a first prefix route which indicates the first subnet, wherein aggregating the first number of host routes is performed by the first VTEP further in response to detecting that a total number of host routes configured for the first subnet on the first VTEP exceeds one of:

a second predetermined threshold based on a maximum number of host routes which can be configured for the first subnet, and a third predetermined threshold based on a total number of routes supported by hardware associated with the first VTEP divided by a total number of subnets configured on the first VTEP.

* * * * *